United States Patent
Benea et al.

(10) Patent No.: US 8,734,753 B2
(45) Date of Patent: May 27, 2014

(54) SURFACE ETCHED DIAMOND PARTICLES AND METHOD FOR ETCHING THE SURFACE OF DIAMOND PARTICLES

(75) Inventors: Ion C. Benea, Wheeling, IL (US); Benjamin Rosczyk, Elk Grove Village, IL (US); Laura Fitzgerald, Palatine, IL (US)

(73) Assignee: Engis Corporation, Wheeling, IL (US)

( * ) Notice: Subject to any disclaimer, the term of this patent is extended or adjusted under 35 U.S.C. 154(b) by 403 days.

(21) Appl. No.: 12/982,444

(22) Filed: Dec. 30, 2010

(65) Prior Publication Data

US 2012/0167480 A1 Jul. 5, 2012

(51) Int. Cl.
*C01B 31/06* (2006.01)
*C09K 3/14* (2006.01)

(52) U.S. Cl.
USPC ............................. 423/446; 51/293

(58) Field of Classification Search
USPC ....................................................... 423/446
IPC .......................................... C01B 31/06,31/065
See application file for complete search history.

(56) References Cited

U.S. PATENT DOCUMENTS

| | | |
|---|---|---|
| 5,035,771 A | 7/1991 | Borse |
| 5,344,526 A | 9/1994 | Nishibayashi et al. |
| 6,565,618 B1 | 5/2003 | Ishizuka |
| 7,275,446 B2 | 10/2007 | Benea et al. |
| 7,481,879 B2 | 1/2009 | Meguro et al. |
| 2010/0028675 A1* | 2/2010 | Gogotsi et al. ................ 428/402 |
| 2010/0213175 A1 | 8/2010 | Peng et al. |

FOREIGN PATENT DOCUMENTS

| | | |
|---|---|---|
| JP | 06-049669 | 2/1994 |
| KR | 10-1997-0074988 | 12/1997 |

OTHER PUBLICATIONS

Theije et al. Oxidative etching of cleaved synthetic diamond {1 1 1} surfaces, 2001, Surface Science, 492, pp. 91-105.*
Theije, F.K. et al., "Oxidative etching of cleaved synthetic diamond surfaces", Surface Science, Oct. 10, 2001, vol. 492, Issues 1-2, pp. 91-105.
Theije, F.K. et al., "Oxidative etching of diamond", Diamond and Related Materials, Apr.-May 2000, vol. 9, Issues 3-6, pp. 929-934.
International Search Report and Written Opinion mailed Mar. 28, 2013 issued in corresponding International Application No. PCT/US2010/062561.

* cited by examiner

*Primary Examiner* — Kaj K Olsen
*Assistant Examiner* — Jared Wood
(74) *Attorney, Agent, or Firm* — McDermott Will & Emery LLP

(57) ABSTRACT

A method is provided of etching a diamond particle including the step of heating the particle at a temperature of about 700° C. or greater in the presence of water vapor to form an etched particle. Also provided is an etched particle having a core and a surface. The core is formed of sp3 hybridized carbon atoms covalently bonded together, and the surface has substantially no chlorine atoms, oxygen atoms or oxygen species.

14 Claims, 10 Drawing Sheets

Untreated diamond surface (negative ions)

Treated diamond surface (negative ions)

Treated diamond surface (negative ions)

SURFACE ETCHED DIAMOND PARTICLES AND METHOD FOR ETCHING THE SURFACE OF DIAMOND PARTICLES

FIELD OF DISCLOSURE

The present disclosure relates to a process for etching the surface of monocrystalline diamond particles by heating the particles in the presence of water vapor. The disclosure also relates to etched diamond particles produced by heating in the presence of water vapor.

BACKGROUND OF THE INVENTION

Diamond powders are widely used in abrasive applications in which diamond particles of a wide range of diameters are either bonded on a variety of tools for drilling, sawing, grinding, cutting, slicing, etc., or bonded to form diamond films or incorporated into slurries and compounds for lapping and polishing applications. In addition, diamond particles can be sintered under high pressure-high temperature (HP-HT) conditions to form an abrasive body/compact (polycrystalline diamond compact or PCD).

The production of high performance diamond tools requires that diamond particles be firmly retained in the bonding material in which they are embedded. A variety of bonding materials are used for the manufacturing of diamond tools, including: metals and metal alloys, glass, ceramics and synthetic resins. The bonding between diamond particles and the bonding material can be mechanical or chemical. Mechanical bonding is when bonding material envelops the diamond particles. In contrast, chemical bonding is when diamond particles react with bonding material to form chemical bonds at the diamond-bonding material interface. Conventional regular monocrystalline diamond particles exhibit smooth surfaces at which bonding occurs. However, bonding strength improves if diamond particles exhibit a rough surface having increased surface area available for bonding, resulting in increased bond retention.

Lapping and polishing of advanced materials wafers (i.e. sapphire, silicon carbide, gallium nitride, gallium arsenide, etc) used in electronics industry require substantially scratch free, high surface finishes. These surfaces may be obtained by using micron and sub-micron size diamond slurries. Monocrystalline diamond particles have a reduced number of sharp cutting points and edges, exhibit irregular shape and are thus more aggressive and prone to random scratching. As opposed to regular monocrystalline diamond particles, the micron size surface etched monocrystalline diamond particles exhibit an increased number of less sharp cutting points and edges. When embedded in the lapping plate and/or incorporated in the slurry which is dripped onto the lapping plate, the surface etched monocrystalline diamond particles are capable of delivering higher surface finishes and less random scratching compared to regular unetched monocrystalline diamond particles.

High pressure-high temperature (HP-HT) sintering of diamond particles into a coherent polycrystalline diamond body/compact (PCD) is achieved either by infiltration of metal, such as cobalt from tungsten carbide-cobalt substrate, or by mixing the diamond particles with a metal powder, such as cobalt, or combinations of metal powders, such as cobalt and tungsten carbide.

Cleanliness of the surface of diamond particles is another characteristic of a strong diamond bonding regardless of whether mechanical or chemical bonding mechanisms are involved. When incorporated in slurries or compounds, surface cleanliness of diamond particles allows for good particle dispersion. Moreover, cleanliness of the surface of diamond particles is important for the high pressure-high temperature sintering of diamond particles into an abrasive body/compact, which requires forming of diamond to diamond "bridges" via covalent bonding of sp3 hybridized carbon atoms.

At elevated temperature, diamond is not chemically inert and it can be eroded by oxygen and oxygen compounds, molten metals and hydrogen. Thermo-chemical etching of diamond can be achieved by using molecular oxygen, potassium nitrate ($KNO_3$), or water vapor.

There are a number of known processes used to etch the surface of diamond particles. For example, one method of etching diamond particles involves heating the diamond particles in oxygen or $KNO_3$ as discussed in "Etching of Diamond in Properties, Growth and Applications of Diamond" M H Nazare and A J Neves, Eds. INSPEC, pp 115. U.S. Pat. No. 5,344,526 discusses the heating of diamond particles in an oxygen atmosphere. U.S. Pat. No. 6,565,618 heats diamond particles in a non-oxidizing atmosphere or vacuum. Other methods involve heating the diamond particles embedded in metal powder while exposed to hydrogen or hydrogen-containing gas, (U.S. Pat. No. 5,035,771) and heating the diamond in air in the presence of metal or metal oxides (US Patent Application Publication No. 2010/0213175 A1).

However, these techniques do not provide sufficient etching concurrently with minimal loss of diamond material, do not provide a good control over the etching process, and lead to contamination of the diamond surface. Furthermore, heating of diamond particles in potassium nitrate, or embedded in metal powders while exposed to hydrogen or hydrogen-containing gas, are chemical reactions that are difficult to control, and require additional processing steps to remove the resulting chemicals/chemical compounds and clean the recovered diamond particles.

SUMMARY OF THE DISCLOSURE

To overcome the above-mentioned problems, the present disclosure is directed toward a method of etching a diamond particle by heating the particle at a temperature of about 700° C. or greater in the presence of water vapor to form an etched particle.

The present disclosure is also directed to an etched particle having a core, and a surface. The core is comprised of sp3 hybridized carbon atoms covalently bonded together, and the surface comprises substantially no chlorine atoms, oxygen atoms or oxygen species.

It is one object of this disclosure to provide a process for etching the surface of diamond particles to provide diamond particles exhibiting a rougher surface and advanced surface cleanliness, and/or diamond particles exhibiting an increased number of cutting edges and corners and advanced surface cleanliness, and/or diamond particles exhibiting rounder particle shapes and advanced surface cleanliness. Such diamond particles to be used for the manufacturing of bonded diamond tools for drilling, sawing, grinding, cutting, slicing, etc., or to be bonded to form diamond films or to be incorporated into slurries and compounds for lapping and polishing. Other possible uses for the etched diamond particles are use as feedstock for high pressure-high temperature sintering of diamond particles into a coherent polycrystalline body/compact (PCD).

It is another object of this disclosure to provide a process for etching the surface of diamond particles which, in addition to etching, also purges the surface of diamond particles of ionic contaminants, thus producing surface etched diamond particles that exhibit advanced surface cleanliness. When incorporated in bonded tools and films, these etched particles exhibit increased bond retention. When incorporated in slurries or compounds, the particles exhibit better particle dispersion. When the etched particles are used as feedstock for HP-HT sintering into a coherent abrasive body/compact (PCD) enhanced formation of diamond to diamond "bridges" via covalent bonding of carbon atoms occurs.

Additionally, it is another object of this disclosure to provide a process for etching the surface of diamond particles which, in addition to surface etching and cleaning, can also produce rounder diamond particles in a desired manner. When compacted in the high pressure-high temperature apparatus during the HP-HT sintering of PCD, such particles enable better powder packing and less breakage and chipping of corners and edges, in addition to increased surface area available for bonding.

It is yet another object of this disclosure to provide a process for etching the surface of diamond particles which have equivalent or greater mechanical strength as compared to the original (unetched) diamond particles.

Additional advantages and other features of the present disclosure will be set forth in part in the description which follows and in part will become apparent to those having ordinary skill in the art upon examination of the following or may be learned from the practice of the disclosure. The advantages of the disclosure may be realized and obtained as particularly pointed out in the appended claims.

As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION OF THE DISCLOSURE

Figure 1:
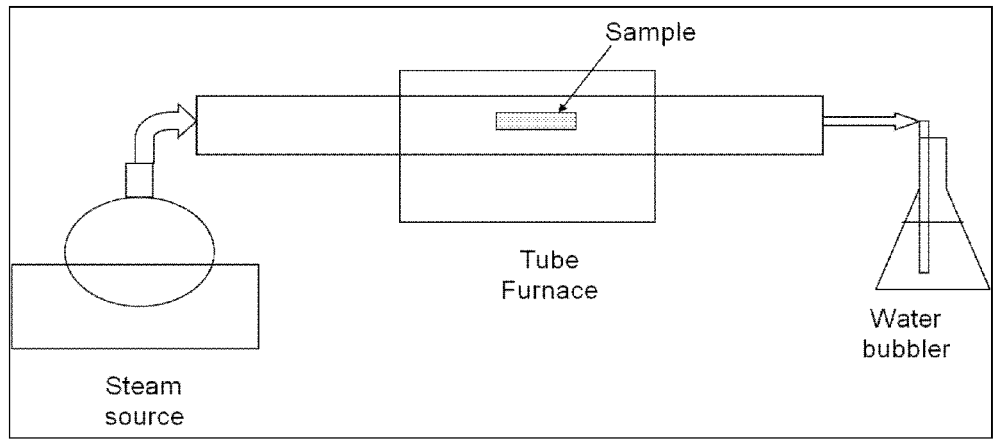
FIG. 1 is a schematic diagram of equipment for carrying out a high temperature water vapor (HTWV) etching process according to one embodiment of the present disclosure.

Referring now to FIG. 1, a general representation of an apparatus used for a high-temperature water vapor etching method according to one embodiment of the present disclosure is shown. The method involves placing diamond particles in a ceramic crucible 50, followed by placing the crucible 50 containing diamond particles in a furnace 20, such as a tubular furnace. An example of a suitable tube furnace used for the HTWV treatment is an F21135 tube furnace from Thermo Scientific (Dubuque, Iowa). The temperature inside the furnace 20 is raised to a pre-set temperature, followed by the injection of water vapor into the furnace, which are supplied from steam generated in the steam source 10 at one end of the furnace 20. Water vapor is passed over diamond particles to etch the particles. Unreacted water vapor, as well as gases resulted from purging the surface of diamond particles, are collected in the bubbler 30, at the other end of the furnace 20.

While water vapor flow rate is kept constant, temperature and time can be adjusted to achieve the desired results with respect to the degree of surface etching and/or particle size and shape modification.

Once the high temperature water vapor treatment (HTWV) is completed, the temperature in the furnace is lower to room temperature ant the etched diamond particles are recovered and analyzed for changes in diamond weight, surface roughness (topography), surface cleanliness (level of ionic contaminants), particle shape (morphology), particle size (particle size distribution), and mechanical strength (crushing strength).

HTWV treated diamond particles recovered from furnace 20 and untreated diamond particles are analyzed to assess changes in diamond particle characteristics, such as diamond weight by high precision scale, surface roughness by scanning electron microscopy (SEM), surface cleanliness by Time of Flight Secondary Ions Mass Spectroscopy (ToF-SIMS), particle size by particle size distribution (PSD) via electrical sensing zone & centrifugal sedimentation, and mechanical strength.

Not being held to theory, it is suggested that etching occurs as a result of absorption of water molecules on the diamond surface. In addition, many of the water molecules undergo dissociation when colliding with the diamond surface to form C—OH and C—H chemical bonds at the surface of the diamond.

In one embodiment of the present disclosure, the method for etching the diamond particles involves a step of heating the particle at a temperature of about 700° C. or greater in the presence of water to form an etched particle. In other embodiments, the particles are heated at a temperature of about 700° C. to about 1,100° C.

The size of a particle used in the process may be of any size suitable for the intended use of the particle. In one embodiment, the particle has a diameter of from about 0.1 µm to about 1000 µm, for example, from about 15 µm to about 20 µm average diameter.

Any type of water may be used in the etching method. In some embodiments, the water used is distilled water. In other embodiments, the water used contains substantially no chlorine atoms. In these embodiments, "substantially no chlorine atoms" means that the amount of chlorine atoms is at a level low enough such that HTWV treatment of diamond particles results in no visible chlorine atom peak in a ToF-SIMS graph of a sample of the surface of the etched diamond particle. Any means suitable for removing chlorine atoms may be employed, such as deionization or distillation.

ToF-SIMS analysis shows a unique surface chemistry "signature" to the HTWV surface etched diamond vs. surface etched diamond produced via other processes. Surface etched diamonds produced via the processes described in the patents cited, is believed to exhibit a different surface chemistry with significantly higher amounts of ionic contaminants—due to the use of chemicals in the etching process.

In contrast, the ToF-SIMS surface chemistry "signature" of the surface etched diamond via HTWV process shows advanced surface cleanliness (very low level of ionic contaminants). The ToF-SIMS results on surface etched diamond produced using distilled water show substantially no Cl-ions.

In some embodiments, the amount of time the particles are heated in the presence of water vapor is from about 1 minute to about 240 minutes. In other embodiments, the heating time is from about 30 minutes to about 120 minutes. The heating time is chosen to obtain a level of surface etching suitable for the intended purpose of the etched particles.

Several characteristics of the etched diamond particles may be desirable to improve the strength or bonding ability of the particle. As such, in certain embodiments, the HTWV method is performed in a manner designed to obtain these characteristics, which will be discussed in the Examples below. Examples of desired characteristics are forming an etched particle with less mass than the particle before the heating step, forming an etched particle that has a surface area greater than the particle before the heating step, forming an etched particle that has a crushing strength index greater than or equal to the particle before the heating step, forming an etched particle that has a roundness greater than the particle before the heating step, forming an etched particle that has a level of ionic contaminants less than the particle before the heating step, and/or forming an etched particle that has a number of cutting edges and corners greater than the particle before the heating step.

The technique and apparatus for measurement of crushing strength (resistance to crushing) of diamond powders is described in the U.S. Pat. No. 7,275,446. The measurement technique is based on the evaluation of the ratio of particles that resist crushing to the initial number of particles (before crushing) in a given diamond powder, when subjected to controlled compression and shear. The technique to determine the crushing strength of diamond powders requires that the particle size distributions (frequency distributions) of the original powders, as well as of the resulting powders (after crushing), be measured using a particle size distribution (PSD) analyzer. In the Examples below, a Beckman Coulter Analyzer—Multisizer 3 (available from Beckman Coulter of Brea, Calif.) was used. PSD data are then used to calculate the crushing strength index of the micron powders.

The following test parameters are used to quantify the crushing strength of micron diamond powders:
  On-size particles in the starting powder (OSS): The cumulative percentiles of particles between 50% and 95% of the frequency distribution, in the starting superabrasive powder (prior to crushing),
  On-size particles in the resulting powder (OSR): The cumulative percentiles of particles between 50% and 95% of the frequency distribution, in the resulting superabrasive powder (after crushing).

The crushing strength and crushing strength index are then defined as follows:
  Crushing strength: The ratio of the on-size particles in the resulting powder (particles that resisted crushing), to the on-size particles in the starting powder, Crushing strength index (CSI):
    $CSI=OSR/OSS\times100$.

EXAMPLES

Example 1

Various amounts of diamond powder, from approx. 1 gram to approx. 3.5 grams, with an average particle size of approx. 0.125 microns were treated for 120 minutes at temperature ranging from 875° C. to 950° C. in the presence of water vapor.

Figure 2:
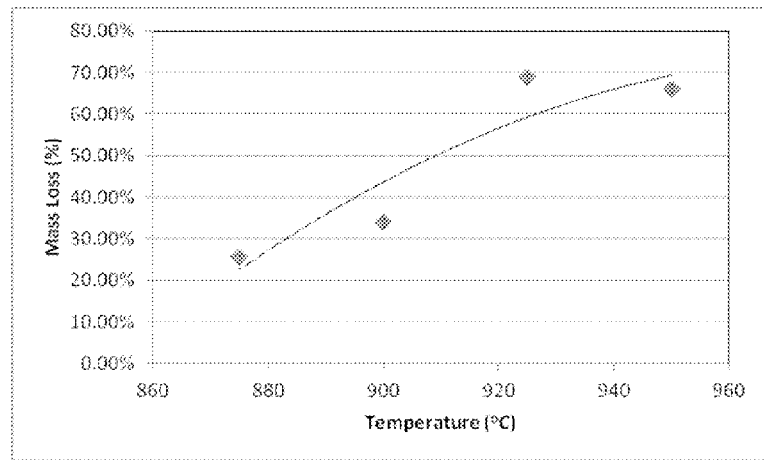
FIG. 2 is a graph showing mass loss vs. temperature for 0.125 micron diamond powder subjected to HTWV treatment for 120 minutes at variable temperature according to another embodiment of the present disclosure.

In each individual run the HTWV treated diamond powder was recovered from the furnace, was weighed and the mass loss was calculated. The experimental data and the mass loss are presented in Table 1, while the mass loss versus temperature is presented in FIG. 2.

TABLE 1

Experimental data and mass loss for 0.125 micron diamond powder subjected to HTWV treatment for 120 minutes at variable temperature.

| Sample | Mass (g) | Temperature (° C.) | Dwell Time (min) | Flow rate (ml/min) | Mass loss % |
|---|---|---|---|---|---|
| 1 | 3.5021 | 950 | 120 | 1.34 | 66.11% |
| 2 | 0.9728 | 925 | 120 | 1.34 | 68.78% |
| 3 | 2.3950 | 900 | 120 | 1.34 | 34.10% |
| 4 | 1.2611 | 875 | 120 | 1.34 | 25.70% |

Figure 3:
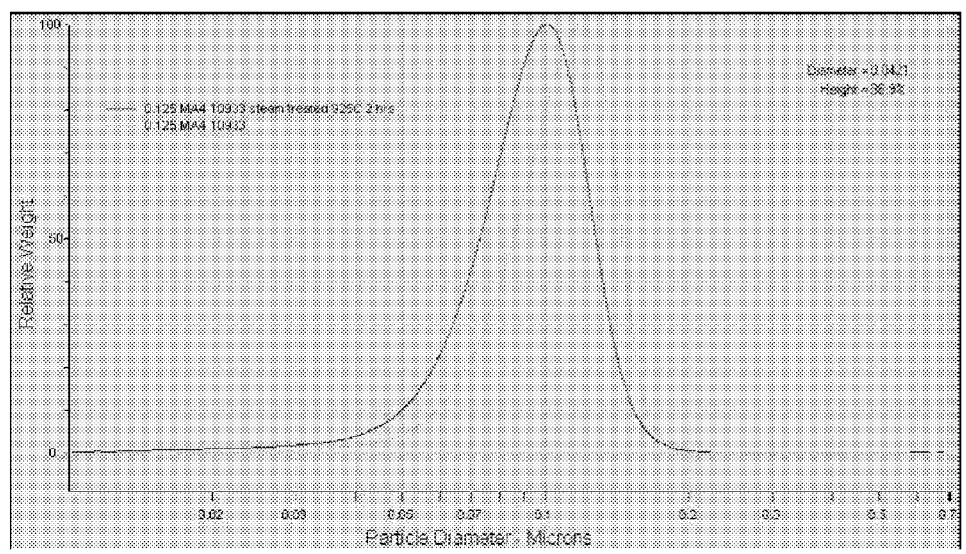
FIG. 3 is a particle size distribution (PSD) overlay graph of 0.125 micron diamond powder before and after being subjected to HTWV treatment according to another embodiment of the present disclosure.

Fine micron diamond powders in and around the size range listed in Table 1 exhibit very large surface area, hence their high reactivity when exposed to the HTWV treatment. The low end of the particle size distribution, such as particles having a diameter of about 0.1 µm and smaller is affected most by this treatment, with very fine particles being most likely completely consumed during the process. To substantiate this effect, the particle size distribution of 0.125 microns metal bond diamond powder was measured before and after treatment, using a centrifugal sedimentation particle size analyzer (CPS Disc Centrifuge, CPS Instruments Inc., Newton, Pa.), and the PSD overlay is presented in the FIG. 3.

Example 2

Figure 4:
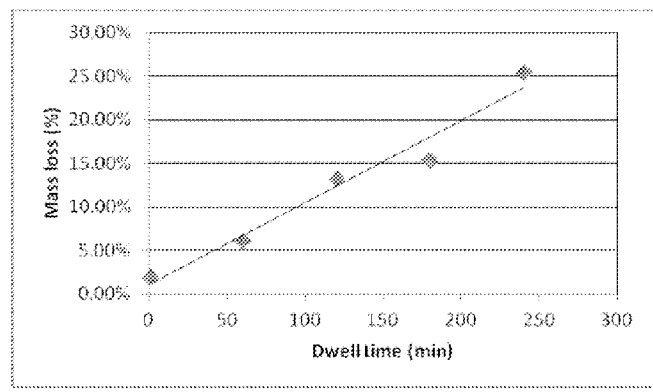
FIG. 4 is a graph showing mass loss vs. temperature for 20 micron diamond powder subjected to HTWV treatment at 1,050° C. and variable time according to another embodiment of the present disclosure.

Using approx. 5 grams of diamond powder with an average particle size of 20 microns, and the same experimental procedure as described in Example 1, HTWV treatments were conducted at a constant temperature of 1,050° C. and different dwell time ranging from 1 minute to 240 minutes in 60 minute increments to determine the optimum dwell time at 1,050° C. for which sufficient etching is produced with least amount of mass loss, as evaluated by weighing the diamond powder before and after HTWV treatment and form the SEM micrographs of the treated powders. Process parameters and mass loss are listed in Table 2, while the graph representing the increase of mass loss with dwell time at constant temperature is presented in FIG. 4.

TABLE 2

Experimental data and mass loss for 20 micron diamond powder subjected to HTWV treatment at 1,050° C. and various heating (dwell) times.

| Sample | Mass (g) | Temperature (° C.) | Dwell Time (min) | Flow rate (ml/min) | Mass loss % |
|---|---|---|---|---|---|
| 1 | 5.0114 | 1050 | 1 | 1.34 | 1.90% |
| 2 | 5.2588 | 1050 | 60 | 1.34 | 6.05% |
| 3 | 5.0147 | 1050 | 120 | 1.34 | 13.24% |
| 4 | 5.4013 | 1050 | 180 | 1.34 | 15.27% |
| 5 | 5.1225 | 1050 | 240 | 1.34 | 25.37% |

As expected, during the HTWV treatment process, the size of the diamond particles is reduced. To substantiate this effect, the particle size distribution of 15 micron and 20 micron metal bond diamond (MB) powder was measured before and after treatment, using a commercially available Beckman Coulter Analyzer—Multisizer 3.

Figure 5:
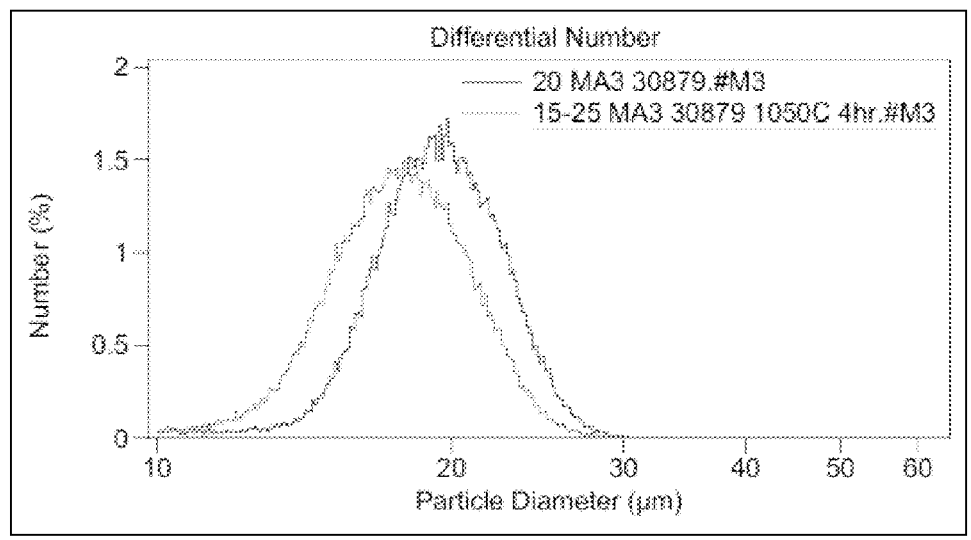
FIG. 5 is a PSD overlay graph of 20 micron diamond powder before and after being subjected to HTWV treatment according to another embodiment of the present disclosure.
Figure 6:
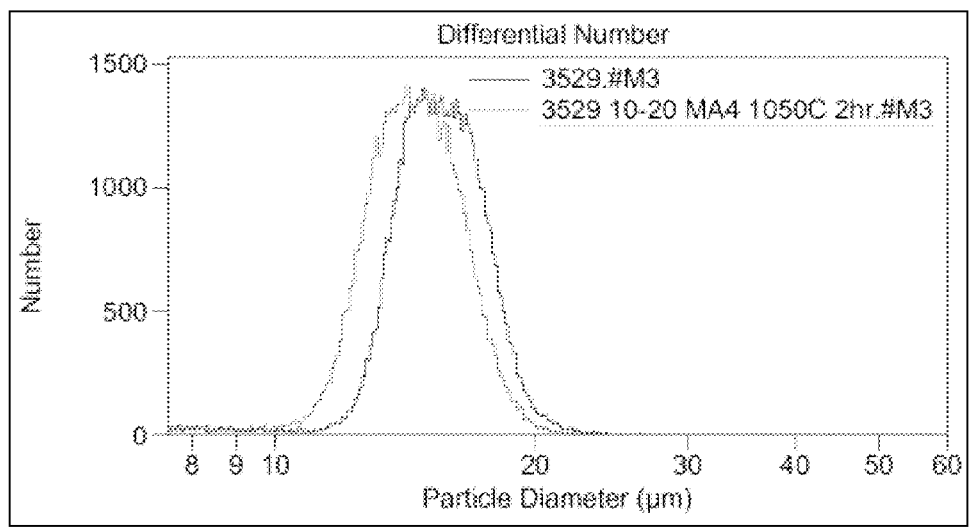
FIG. 6 is a PSD overlay of 15 micron diamond powder before and after being subjected to HTWV treatment according to another embodiment of the present disclosure.
Figure 7A:
FIG. 7a is a scanning electron microscope (SEM) micrograph of unetched 20 micron diamond particles at 1000× magnification according to another embodiment of the present disclosure.
Figure 7B:
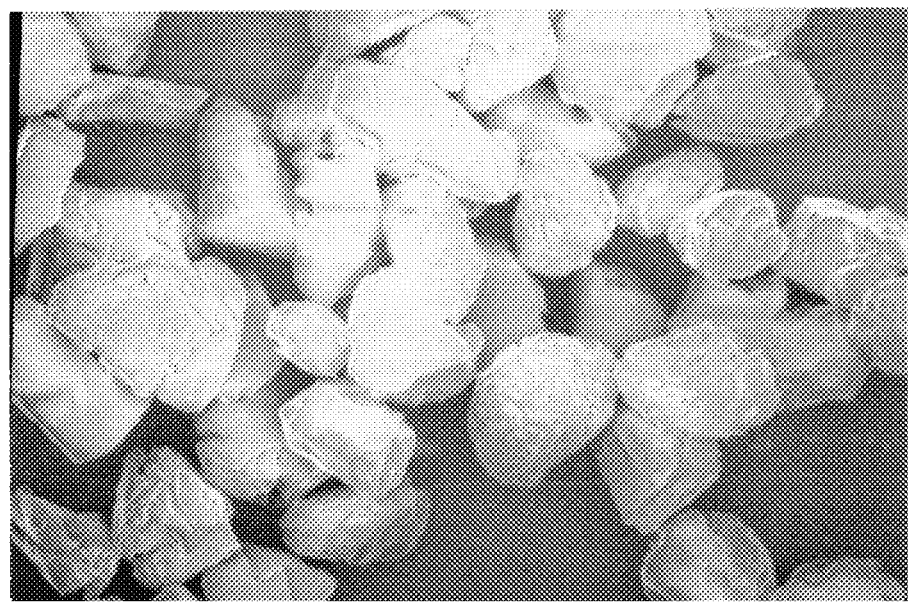
FIG. 7b is a SEM micrograph of the 20 micron diamond particles of FIG. 7a at 1000× magnification after an HTWV etching treatment according to another embodiment of the present disclosure.
Figure 7C:
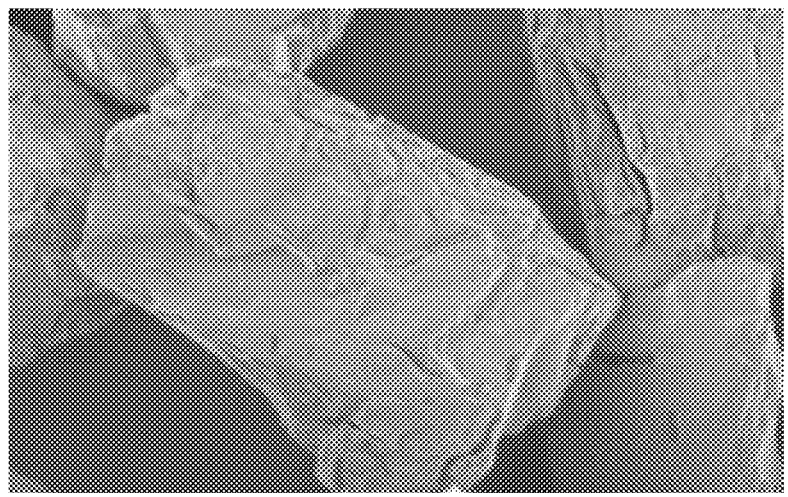
FIG. 7c is a SEM micrograph of the surface etched 20 micron diamond particles of FIG. 7b at 3500× magnification.
Figure 7D:
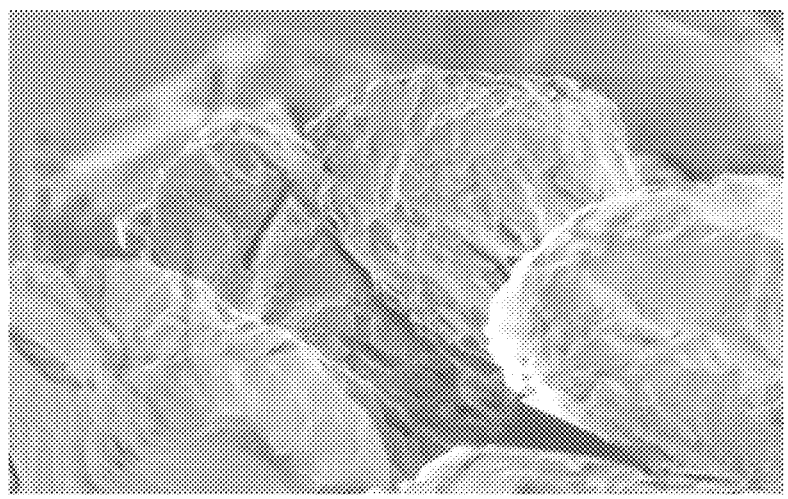
FIG. 7d is a SEM micrograph of the surface etched 20 micron diamond particles of FIG. 7b at 4000× magnification.
Figure 7E:
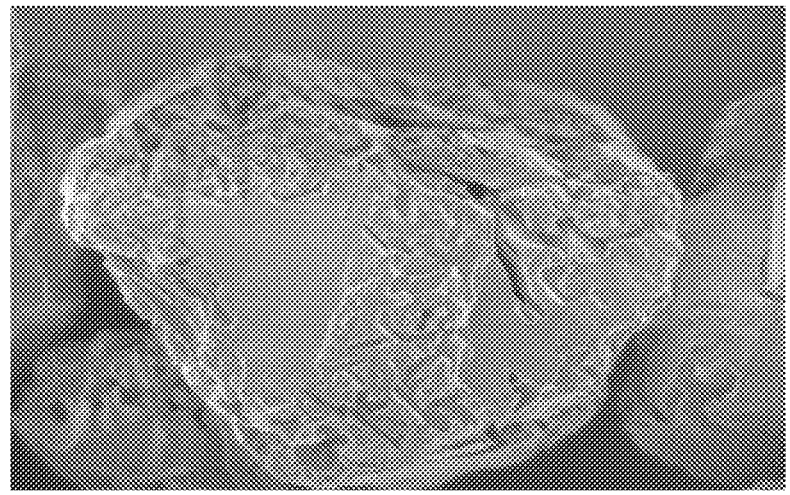
FIG. 7e is a SEM micrograph of the surface etched 20 micron diamond particles of FIG. 7b at 4500× magnification.
Figure 7F:
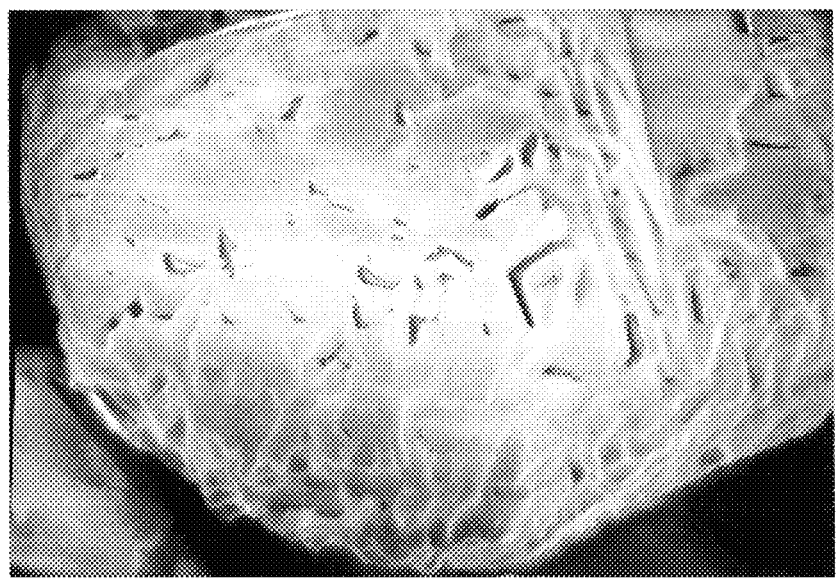
FIG. 7f is a SEM micrograph of the surface etched 20 micron diamond particles of FIG. 7b at 5000× magnification.

The overlay of particle size distributions before and after treatment is depicted in FIG. 5 and FIG. 6, and the particle size data is presented in Table 3.

TABLE 3

PSD data for 20 micron and 15 micron metal bond (MB) diamond powder subjected to HTWV treatment.

| | 5% | 50% | 95% | 99.9% |
|---|---|---|---|---|
| 20 μm MB - untreated | 15.07 | 19.43 | 24.46 | 29.10 |
| 20 μm MB - treated 4 h @ 1050° C. | 13.31 | 17.73 | 22.88 | 28.27 |
| 15 μm MB - untreated | 12.79 | 15.47 | 18.69 | 24.98 |
| 15 μm MB - reated 2 h @ 1050° C. | 11.70 | 14.47 | 17.72 | 21.95 |

SEM micrographs of unetched and etched 20 micron diamond crystals are presented in FIGS. 7a-7f.

To prove that the mechanical strength of diamond particles is not altered following the HTWV treatment, the CSI of 20 micron MB diamond powder, untreated and treated (surface etched) was measured using the technique and apparatus described in U.S. Pat. No. 7,275,446. During the crushing test, diamond particles are subjected simultaneously to compaction and shear. Crushing strength measurement was performed using 30 mg of 20 micron MB diamond powder, 20 lb compression force and 10 RPM for 10 seconds. Each measurement was performed three times on each untreated and treated diamond powder and the average CSI and standard deviation was calculated. The crushing strength test results are presented in Table 4.

TABLE 4

CSI data for 20 micron metal bond diamond powder untreated and treated.

| 20 microns MB diamond | CSI (%) | | | CSI (%) | |
|---|---|---|---|---|---|
| | Trial 1 | Trial 2 | Trial 3 | Avg. | St. Dev |
| Untreated | 48.09 | 55.09 | 52.84 | 52.2 | 3.8 |
| Treated | 62.38 | 63.77 | 62.35 | 62.8 | 0.8 |

Crushing test results demonstrate that HTWV treatments do not necessarily lead to decay of mechanical strength (crushing strength) of diamond particles. In the experiments shown in Table 4, the mechanical strength of diamond particles increased slightly following the HTWV treatment. The increase in mechanical strength of diamond particles subjected to HTWV treatment is due to the annealing of internal defects coupled with a reduced incidence of breakage and chipping of corners and edges.

Due to metallic impurities trapped inside diamond crystals during the HPHT crystal growth process (intrinsic impurities), mechanical strength of diamond particles decreases when exposed to high temperature in excess of approx. 900° C. However, if the level of intrinsic metallic impurities is low, when exposed to high temperature, mechanical strength of diamond particles increases as shown above. Therefore, by choosing an appropriate temperature range for the etching process, in relationship with the size of the diamond particle and the level of crystal growth defects (low level of intrinsic metallic impurities) it is possible to achieve etching of diamond particles without the decay of the mechanical strength.

Figure 8A:
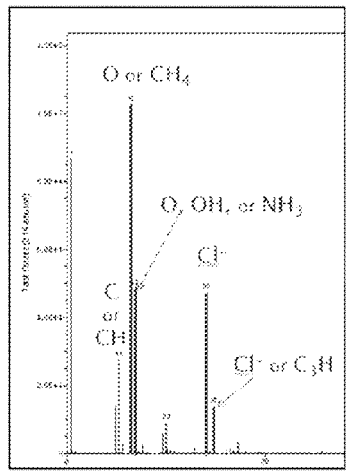
FIG. 8a is a Time of Flight-Secondary Ion Mass Spectrometry (ToF-SIMS) graph of unetched 15 micron diamond particles.
Figure 8B:
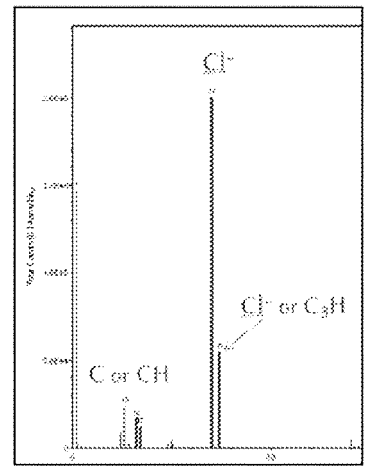
FIG. 8b is a ToF-SIMS graph of the 15 micron diamond particles of FIG. 8a that have been etched according to another embodiment of the present disclosure.
Figure 8C:
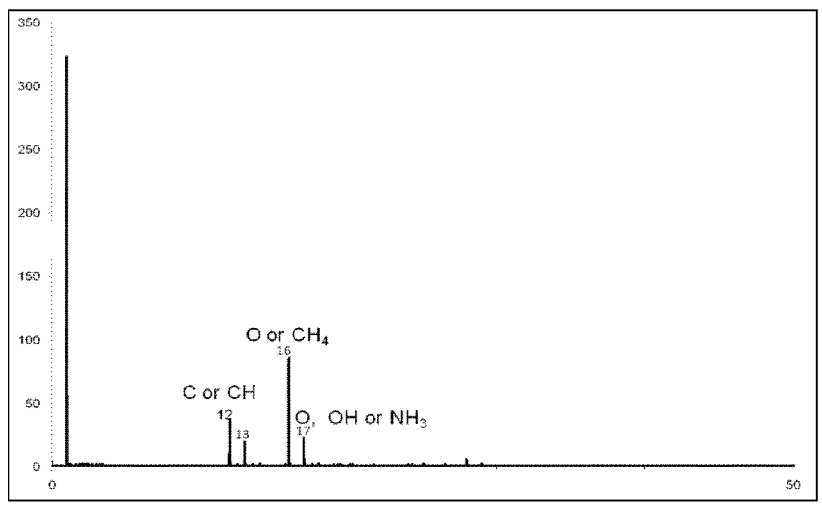
FIG. 8c is a ToF-SIMS graph of 15 micron diamond particles surface etched using distilled water according to another embodiment of the present disclosure.

The etching process also removes ionic contaminants from the surface of diamond particles. To assess the cleanliness of the surface of diamond particles as a result of the etching process, ToF-SIMS was performed on both untreated and treated (surface etched) 15 micron MB diamond powder. The results of the ToF-SIMS are presented in FIG. 8a. As shown, the surface of diamond particles before treatment exhibits a significant peak at 16 and 17 atomic mass units (amu). After treatment, this peak is much smaller when compared to the 12 and 13 amu peaks, which are the carbon peaks that should remain constant during the HTWV process. The lowering of the 16 and 17 amu peaks is likely due to a removal of oxygen or oxygen species from the surface. However, as depicted in FIG. 8a, when tap water was used for vapor generation, a slight increase of the chlorine peak is noticed on treated diamond. The increase of chlorine after treatment is most likely due to ion/salts in water depositing on the surface of diamond particles during HTWV treatment. The chlorine peak is eliminated and the surface cleanliness is further improved if distilled water is used for vapor generation. As depicted in FIG. 8b, after treatment, no chlorine peak is detected using ToF-SIMS analysis when distilled water is used as the water vapor source.

Example 3

Figure 9:
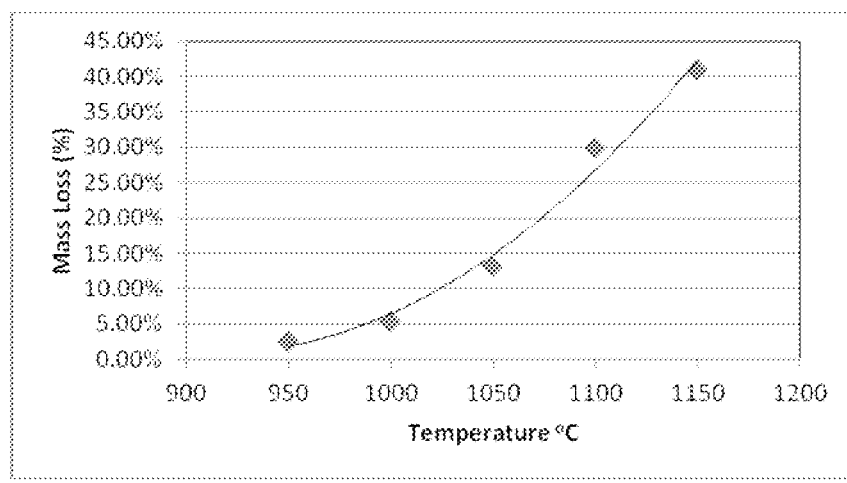
FIG. 9 is a graph showing mass loss vs. temperature for 20 micron diamond powders subjected to HTWV treatment for 120 minutes and various temperatures according to another embodiment of the present disclosure.

Using approx. 5 grams of diamond powder with an average particle size of 20 microns, and same experimental procedure as described in Example 1, HTWV treatment runs were carried out at a constant dwell time of 120 minutes and different temperatures ranging from 950° C. to 1100° C. in 50° C. increments to determine the optimum temperature at 120 min dwell time for which sufficient etching is produced with least amount of mass loss, as evaluated by weighing the diamond powder before and after HTWV treatment and form the SEM micrographs of the treated powders. Process parameters and mass loss are listed in the Table 5, while the graph representing the increase of mass loss with dwell time at constant temperature is presented in FIG. 9.

TABLE 5

Experimental data and mass loss for 20 micron diamond powder subjected to HTWV treatment for 120 minutes and various temperatures.

| Sample | Mass (g) | Temperature (° C.) | Dwell Time (min) | Flow rate (ml/min) | Mass loss % |
|---|---|---|---|---|---|
| 1 | 5.2370 | 1150 | 120 | 1.34 | 41.06% |
| 2 | 5.0853 | 1100 | 120 | 1.34 | 29.89% |
| 3 | 5.0147 | 1050 | 120 | 1.34 | 13.24% |
| 4 | 5.4435 | 1000 | 120 | 1.34 | 5.42% |
| 5 | 6.0136 | 950 | 120 | 1.34 | 2.65% |

Example 4

Using approx. 5 grams of commercially available high quality synthetic diamond powder with 400/500, 325/400, 40/50 and 45/50 mesh size, and same experimental procedure as described in Example 1, HTWV treatment runs were carried out at a constant temperature of 1050° C. and constant dwell time of 120 min to assess the surface etching and the amount of mass loss of different size diamond crystals under identical etching conditions. Process parameters and mass loss are listed in Table 6.

TABLE 6

Experimental data and mass loss for different mesh size diamond powders subjected to HTWV treatment for 120 minutes at 1050° C.

| Sample | Size (Mesh) | Mass (g) | Temperature (° C.) | Dwell Time (min) | Flow rate (ml/min) | Mass loss % |
|---|---|---|---|---|---|---|
| 1 | 400/500 | 5.0478 | 1050 | 120 | 1.34 | 78.31% |
| 2 | 325/400 | 3.5536 | 1050 | 120 | 1.34 | 65.70% |
| 3 | 325/400 | 4.5817 | 1050 | 120 | 1.34 | 40.59% |
| 4 | 40/50 | 4.3356 | 1050 | 120 | 1.34 | 3.71% |
| 5 | 45/50 | 4.9998 | 1050 | 120 | 1.34 | 1.61% |

Figure 10A:
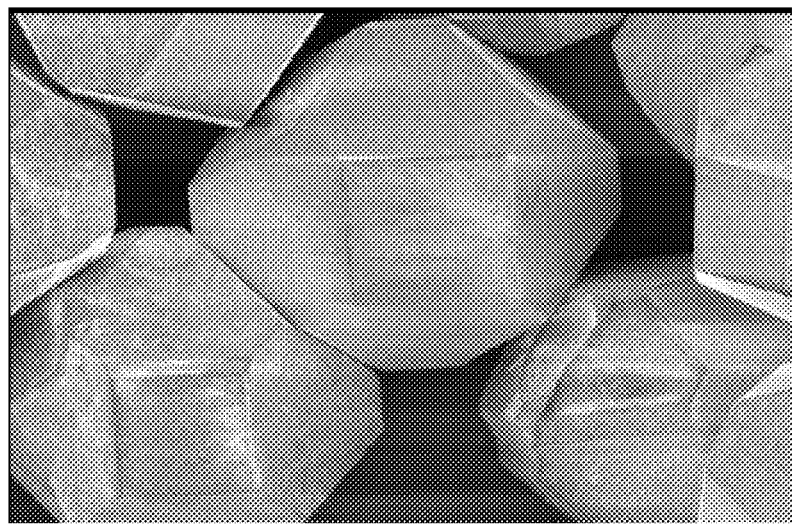
FIG. 10a is a SEM micrograph of unetched 40/50 mesh diamond particles according to another embodiment of the present disclosure.
Figure 10B:
FIG. 10b is a SEM micrograph of the unetched 40/50 mesh diamond particles of FIG. 10a at 300× magnification.
Figure 11A:
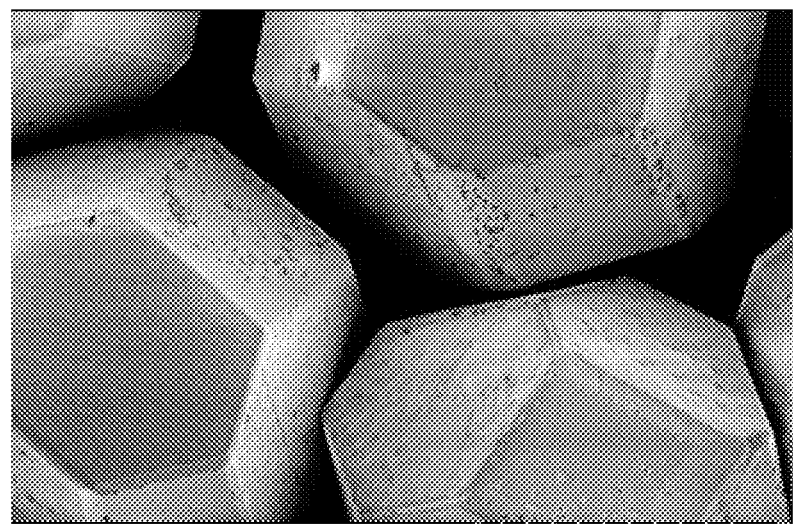
FIG. 11a is a SEM micrograph of the surface etched 40/50 mesh diamond particles of FIG. 10a at 200× magnification.
Figure 11B:
FIG. 11b is a SEM micrograph of the surface etched 40/50 mesh diamond particles of FIG. 10a at 250× magnification.
Figure 11C:
FIG. 11c is a SEM micrograph of the surface etched 40/50 mesh diamond particles of FIG. 10a at 500× magnification.

SEM micrographs of unetched and etched 40/50 mesh diamond crystals are presented in FIGS. 10 a, b and 11 a, b, c, respectively. As is evident from the SEM micrographs, the etching patterns of the present disclosure are distinctively different than etching patterns from other methods, such as those based on diamond oxidation process, such as the heating of diamond particles in an oxygen atmosphere as disclosed in U.S. Pat. No. 5,344,526.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the disclosure. However, it should be recognized that the present disclosure can be practiced without resorting to the details specifically set forth. In other instances, well known processing structures have not been described in detail, in order not to unnecessarily obscure the present disclosure.

Only a few examples of the present disclosure are shown and described herein. It is to be understood that the disclosure is capable of use in various other combinations and environments and is capable of changes or modifications within the scope of the inventive concepts as expressed herein.

The invention claimed is:

1. A method of etching a particle, the method comprising the step of:
   heating the particle at a temperature of 700° C. or greater in a reactor,
   injecting water vapor into the reactor, without providing oxygen gas, to form an etched particle,
   wherein the particle consists essentially of monocrystalline diamond, and
   wherein the particle has a diameter of from about 0.1 μm to about 1000 μm.

2. The method of claim 1, wherein the particle is heated at a temperature of about 700° C. to about 1,100° C.

3. The method of claim 1, wherein the particle has a diameter of from about 15 μm to about 20 μm.

4. The method of claim 1, wherein the water vapor is obtained from distilled water.

5. The method of claim 1, wherein the water vapor contains substantially no chlorine atoms.

6. The method of claim 1, wherein the particle is heated for about 1 minute to about 240 minutes.

7. The method of claim 1, wherein the particle is heated for about 30 minutes to about 120 minutes.

8. The method of claim 1, comprising performing the heating step such that the etched particle has a mass less than the particle before the heating step.

9. The method of claim 1, comprising performing the heating step such that the etched particle has a surface area greater than the particle before the heating step.

10. The method of claim 1, comprising performing the heating step such that the etched particle has a crushing strength index greater than or equal to the particle before the heating step.

11. The method of claim 1, comprising performing the heating step such that the etched particle has a roundness greater than the particle before the heating step.

12. The method of claim 1, comprising performing the heating step such that the etched particle has a level of ionic contaminants less than the particle before the heating step.

13. The method of claim 1, comprising performing the heating step such that the etched particle has a number of cutting edges and corners greater than the particle before the heating step.

14. The method of claim 1, wherein:
   the water vapor contains substantially no chlorine atoms,
   the particle is heated at temperature of about 700° C. to about 1,100° C.,
   the diamond particle is heated for about 1 minute to about 240 minutes, and
   the step of heating the particle causes the particle to lose mass during the heating step.

* * * * *